April 25, 1944.      C. D. SWAN      2,347,524
TRAILER FRONT END STABILIZER AND REST
Filed May 18, 1942      2 Sheets-Sheet 1

Inventor

CHARLES D. SWAN,

By Clarence A. O'Brien
and Harvey B. Jacobson, Attorneys

April 25, 1944.  C. D. SWAN  2,347,524
TRAILER FRONT END STABILIZER AND REST
Filed May 18, 1942   2 Sheets-Sheet 2
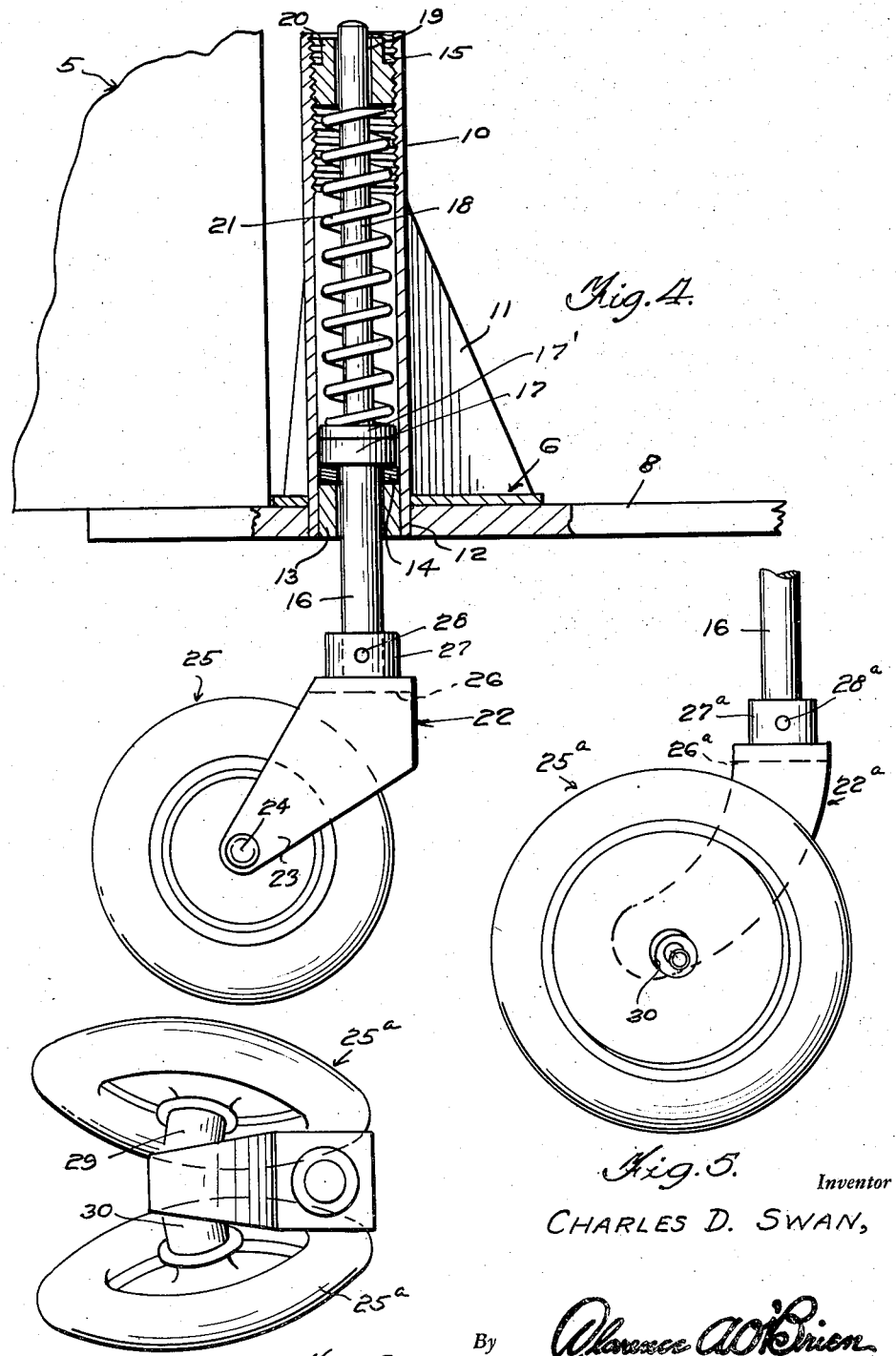

Patented Apr. 25, 1944

2,347,524

UNITED STATES PATENT OFFICE 2,347,524

TRAILER FRONT END STABILIZER AND REST

Charles D. Swan, Trenton, Mich.

Application May 18, 1942, Serial No. 443,506

1 Claim. (Cl. 280—33.4)

The invention relates to means for stabilizing the front end of trailer vehicles while they are being drawn along, the said means being usable to support the front end of the trailer vehicle while detached from the tractor vehicle, and the primary object of the invention is to provide arrangements of the character indicated which operate to reduce the burden and strain ordinarily imposed by trailer vehicles upon the tractor vehicles and to substantially eliminate swerving and steering imperfections during the travel of the trailer, especially over uneven surfaces.

Other important objects and advantages of the invention will be apparent from a reading of the following description taken in connection with the appended drawings, wherein for purposes of illustration there are shown preferred embodiments of the invention.

In the drawings:

Figure 4 is an enlarged fragmentary longitudinal vertical sectional view taken through Figure 2 along the line 4—4 and looking upwardly in the direction of the arrows.

Figure 5 is a fragmentary side elevational view of a modified form of wheel fork.

Figure 6 is a top plan view of Figure 5.

Figure 1:
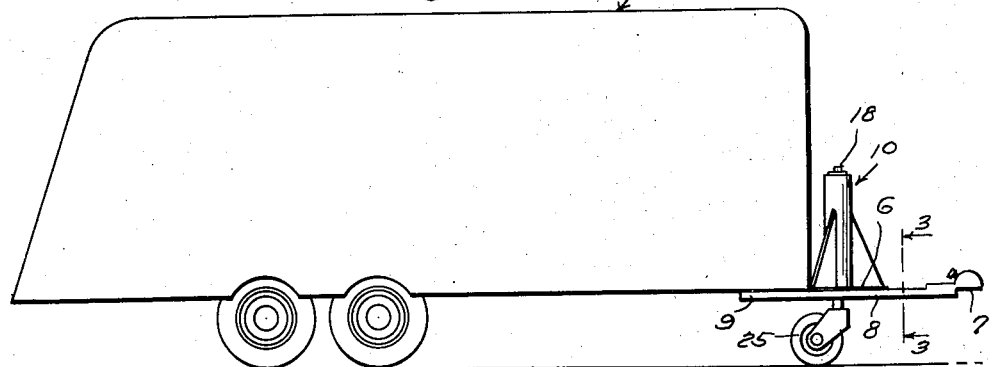
Figure 1 is a general side elevational view showing a trailer vehicle equipped in accordance with the present invention.
Figure 2:
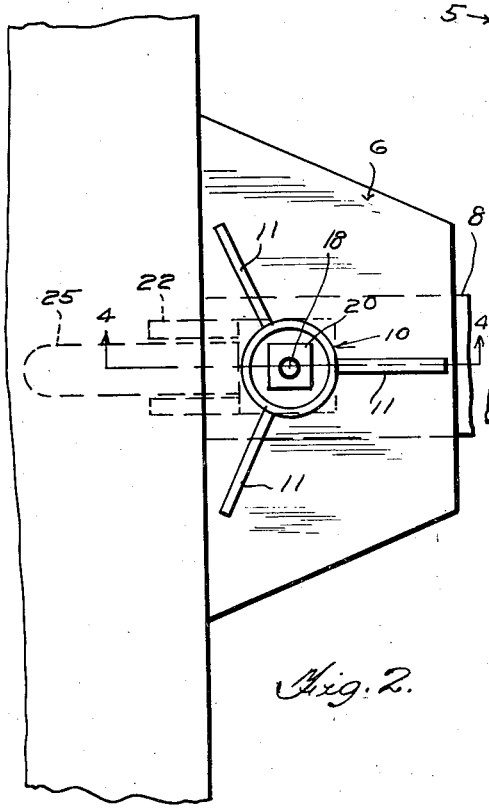
Figure 2 is an enlarged fragmentary top plan view of the trailer vehicle tongue in accordance with the present invention.
Figure 3:
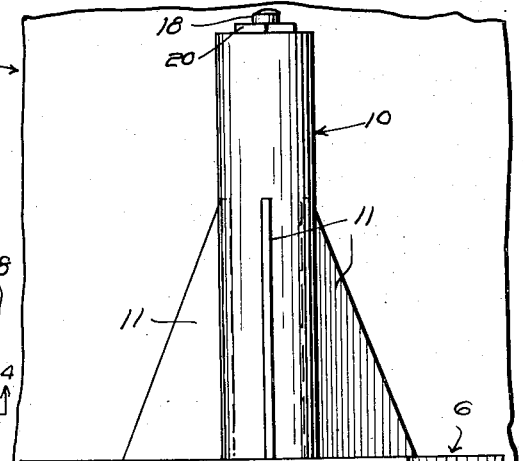
Figure 3 is an enlarged fragmentary transverse vertical sectional view taken through Figure 1 along the line 3—3 and looking toward the left in the direction of the arrows.

Referring in detail to the drawings, the numeral 5 generally designates a substantially conventional form of trailer vehicle, such as a house trailer having the draft tongue 8 in the form of a relatively narrow forwardly extending bar terminating in a coupling element 7 at its forward end. In accordance with the present invention the existing relatively narrow element 8 is surmounted and reinforced by the relatively wide plate 6 which has portions 9 attached to the bottom of the forepart of the trailer for reinforcing and stabilizing purposes. Mounted on the plate 6 at the longitudinal center of the vehicle is the vertical tubular casing 10 which has circumferentially spaced triangular reinforcing brackets 11 secured to the plate 6, a lower portion of the tubular casing passing downwardly through the plate 6 and through an opening 12 in the existent draft element 8 as clearly shown in Figure 4 of the drawings. A tubular bushing 13 is fixed in the lower end of the tubular casing 10 and is surmounted by a shock absorbing washer 14, and the upper part of the casing is interiorly threaded as indicated by the numeral 15. A plunger 16 having a relatively loose sliding fit in the bushing 13 has on its upper end an enlarged collar 17 which is adapted to rest upon the shock absorbing washer 14 in certain positions of the plunger. The plunger has a reduced axial extension 18 which rises above the collar 17 and has a loose sliding fit at its upper end in the smooth bore 19 of the nut 20 whose external threads engage the interior threads 15 at the upper end of the casing 10. A compressed expanding helical spring 21 is circumposed on the extension 18 and has its upper end engaging the nut 20 and its lower end engaged with a thrust washer 17' which is loosely circumposed on the extension 18 between the lower end of the spring and the collar 17. The washer 17' being free with respect to the collar 17 and the shaft extension 18, permits the shaft 16 to rotate freely without distorting the spring 21 in different compressed positions of the spring as the shaft 16 moves up and down and rotates as the wheels 25 or 25a follow the road contours.

In the single wheel fork arrangement shown in Figures 1 through 4, the fork which is generally designated 22 has substantially triangular fork members 23 which carry the wheel axle 24 at the lower end, with the pneumatic tired wheel 25 mounted thereon. The forked elements are joined by a plate portion 26 which has rising therefrom a socket 27 to receive the lower end of the plunger 16, the socket having a pin 28 extending thereacross to pass through an opening formed in the lower end of the plunger to secure the fork to the plunger.

In the dual wheel arrangement shown in Figures 5 and 6, the equivalent of the fork 22 is generally designated 22a and comprises a curved body surmounted by a socket 27a provided with a transverse pin 28a for receiving and locking the plunger 16, the dual wheel arrangement being interchangeable for the single wheel arrangement. Stub axle forms 29 and 30 project at opposite downward angles from opposite sides of the lower part of the body 22a and ground dual pneumatic tired wheels 25a in forward and inwardly converging relation as indicated in Figure 6 of the drawings.

It will be apparent that in moving along a highway while being pulled by a tractor vehicle the trailer will operate the wheel 25 or the dual wheel 25a in the same manner as a caster so that the wheels will trail as indicated in Figure 1 of the drawings, the plunger 16 being free to rotate in the casing 10 toward this end.

It will also be observed that as unevennesses in the pavement are engaged by the wheel, the shock will be taken up by the spring 21 instead of being entirely transmitted to the tractor vehicle through the coupling tongue 8, as is usually the case. The castering action of the wheel and the resistance which it offers to sidesway of the front end of the trailer, reduces the side motion of the trailer relative to the tractor vehicle, thereby in another way reducing the strain upon the tractor vehicle and making steering and operation of the tractor vehicle steadier and easier. It will also be observed that when the tractor vehicle is disconnected from the trailer it is unnecessary to provide and place a special prop for the then unsupported front end of the trailer, since the spring 21 will keep the wheels 25 or wheels 25a engaged with the ground so as to support the front end of the trailer without the need of additional means.

Although there is shown and described herein preferred embodiments of the invention, it is to be understood that it is not desired to limit the application of the invention thereto except as may be required by the scope of the subjoined claim.

Having described the invention, what is claimed as new is:

A rest and stabilizer for the front end of a trailer having a draft tongue attachable to a tractor vehicle, said rest and stabilizer comprising a horizontal plate mounted to project from the front part of the trailer along said tongue, a vertical tubular casing rising from said plate and passing at its lower end through said plate, a tubular bushing fixed in the lower end of said casing, a tubular nut threaded in the interior of the upper part of said casing, a rotary plunger passing through said tubular bushing and having a collar to engage the upper end of the bushing, said plunger depending below said casing, a wheel fork fixed to the lower end of said plunger mounting ground engaging wheel means, an extension on said plunger rising above said collar and slidable through the tubular nut, a rotatable thrust washer on said plunger to engage the upper side of the collar, and a helical expanding spring circumposed on said extension between said thrust washer and said nut to resist upward movement of said plunger responsive to road inequalities.

CHARLES D. SWAN.